(12) United States Patent
Sasaki et al.

(10) Patent No.: US 7,137,379 B2
(45) Date of Patent: Nov. 21, 2006

(54) METHOD FOR RICH PULSE CONTROL OF DIESEL ENGINES

(75) Inventors: Shizuo Sasaki, San Antonio, TX (US); Gary D. Neely, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 11/168,216

(22) Filed: Jun. 28, 2005

(65) Prior Publication Data

US 2006/0037307 A1 Feb. 23, 2006

Related U.S. Application Data (60) Provisional application No. 60/603,204, filed on Aug. 20, 2004.

(51) Int. Cl.
*F01N 3/18* (2006.01)

(52) U.S. Cl. .................. 123/299; 123/443; 60/301; 701/103

(58) Field of Classification Search ............... 123/299, 123/443; 60/301; 701/103
See application file for complete search history.

(56) References Cited

U.S. PATENT DOCUMENTS

| | | | |
|---|---|---|---|
| 5,595,060 A * | 1/1997 | Togai et al. ............... 60/274 |
| 5,657,625 A * | 8/1997 | Koga et al. ............... 60/274 |
| 5,732,554 A | 3/1998 | Sasaki et al. | |
| 5,937,639 A | 8/1999 | Sasaki et al. | |
| 6,286,482 B1 | 9/2001 | Flynn et al. | |
| 6,338,245 B1 | 1/2002 | Shimoda et al. | |
| 6,389,802 B1 | 5/2002 | Berger et al. | |
| 6,561,157 B1 | 5/2003 | zur Loye et al. | |
| 6,615,580 B1 | 9/2003 | Khair et al. | |
| 6,644,020 B1 | 11/2003 | Kuenstler et al. | |
| 6,907,862 B1 * | 6/2005 | Kitahara ................... 123/434 |
| 2003/0209009 A1 | 11/2003 | Chamoto et al. | |
| 2003/0213232 A1 * | 11/2003 | Brisley et al. ............. 60/285 |
| 2005/0222748 A1 * | 10/2005 | Naik et al. ................ 701/103 |
| 2005/0241296 A1 * | 11/2005 | McCabe et al. ........... 60/274 |

* cited by examiner

*Primary Examiner*—Erick R Solis
(74) *Attorney, Agent, or Firm*—Gunn & Lee, P.C.

(57) ABSTRACT

A combustion control method for the rich pulse control of Diesel engines with Lean $NO_X$ Trap systems includes identifying areas within a Diesel engine operating regime in which reduced recirculated exhaust gas and air with increased pre-mixed combustion is effective in providing fuel rich combustion, and a second, lower load, region in which low temperature combustion is particularly desirable.

4 Claims, 2 Drawing Sheets

METHOD FOR RICH PULSE CONTROL OF DIESEL ENGINES

This is a non-provisional application claiming priority to U.S. Provisional Application Ser. No. 60/603,204 filed Aug. 20, 2004.

BACKGROUND OF THE INVENTION

1. Technical Field

This invention relates generally to a method of controlling the injection of fuel into Diesel engines to selectively provide a rich fuel mixture, and more particularly to such a method in which a rich fuel mixture is used to provide fuel rich combustion products for the periodic regeneration of lean $NO_X$ traps.

2. Background Art

Worldwide emissions regulations slated for introduction in the near future will require that practically all internal combustion engines be equipped with some form of exhaust treatment device. Perhaps of most concern are the proposed reductions in $NO_X$ emissions because they are the most difficult to mitigate from the exhaust stream of fuel-lean combustion, typical of Diesel engine combustion. One of the most promising technologies for $NO_X$ treatment is a $NO_X$ adsorber, also known as a "Lean $NO_X$ Trap" (LNT). However, these devices generally require that products of fuel-rich combustion be periodically passed through the LNT catalyst in order to regenerate the $NO_X$ trapping sites and convert the released $NO_X$ into $N_2$ and $CO_2$.

For example, U.S. Pat. No. 5,732,554 issued Mar. 31, 1998 to Shizuo Sasaki, et al. for an EXHAUST GAS PURIFICATION DEVICE FOR AN INTERNAL COMBUSTION ENGINE describes a rich combustion control method for reducing soot emissions by lowering the amount of excess air while simultaneously increasing the quantity of pre-mixed fuel. However, it has been discovered that the reduction of excess air flowing through the engine, such as by increasing the exhaust gas recirculation rate, has an adverse effect on smoke production and fuel economy at higher engine loads.

U.S. Pat. No. 5,937,639 granted Aug. 17, 1999 to Shizuo Sasaki, et al. for an INTERNATIONAL COMBUSTION ENGINE describes a method for lowering the combustion temperature to minimize smoke generation during rich, or near rich, combustion. However, it has been found that lowering combustion temperature cannot be used effectively over all of a Diesel engine's operating regime. Dr. Shizuo Sasaki, a co-inventor of the above referenced patents is also a co-inventor of the present invention.

The present invention is directed to overcoming the problems set forth above with respect to providing rich pulse control of combustion over the entire operating regime of a Diesel engine. It is desirable to have such a method that avoids the problem of smoke production when operating at reduced air flow rates. It is also desirable to have such a method that concurrently avoids localized high combustion temperatures when operating in relatively low load regions of a Diesel engine's operating regime. Furthermore, it is desirable to have a method for providing rich pulse control that does not produce wide torque fluctuations and eliminates oil dilution caused by post fuel injection when operating at relatively low loads.

SUMMARY OF THE INVENTION

In accordance with one aspect of the present invention, a method for controlling fuel injection to provide a rich combustion mixture for periodically regenerating a Lean-$NO_X$ Trap disposed in an exhaust system of a Diesel engine, includes sensing engine speed and engine load and providing a load-speed map of the engine operating regime. A region of the engine operating regime in which low combustion temperature is desired to provide a rich combustion mixture in accordance with the present invention is defined, and when the engine is operating within the defined low combustion temperature operating area, exhaust gas recirculation is increased and intake air is reduced. Also, the volume of fuel injected during the main fuel injection event is increased and the timing of injection advanced. When the engine is operating outside of the defined low combustion temperature area of the engine operating regime, exhaust gas recirculation is decreased and the amount of intake air generally reduced. Furthermore, when operating in a region outside of the defined low temperature combustion region, the volume of fuel injected during the main fuel injection event of the combustion cycle is increased and the timing of the main fuel injection retarded.

Other features of the method for selectively controlling fuel injection, in accordance with the present invention, include optionally selectively increasing the volume and advancing the timing of fuel injected during pilot fuel injection of the combustion cycle when the engine is operating outside of the defined desirable low combustion temperature zone of the engine operating regime.

Other features of the method for selectively controlling fuel injection to provide a rich combustion mixture, in accordance with the present invention, include sensing engine coolant temperature, a parameter representative of the altitude at which the engine is operating, the ambient temperature and the cetane value of the fuel combusted in the engine. The region of the engine map identified as the desirable area for low combustion temperature control of a rich fuel mixture is modified to include a higher engine operating load in response to a decrease in engine coolant temperature and an increase in altitude. The map of the engine operating regime is also modified by limiting the desired low combustion temperature operating area to a lower engine operating load in response to an increase in ambient temperature or fuel quality, e.g., an increase in fuel cetane value.

DETAILED DESCRIPTION OF THE PREFERRED EMBODIMENT

Figure 1:
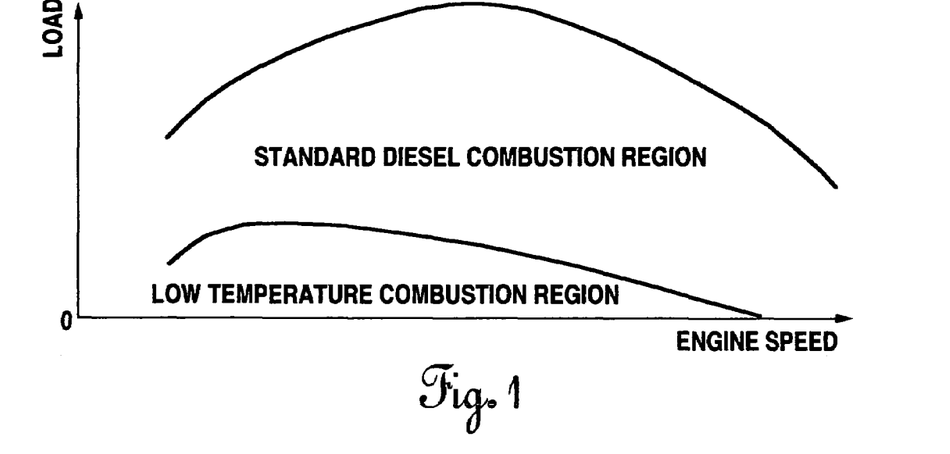
FIG. 1 is a representative map of the operating regime of a Diesel engine over a range of engine load and speed, as divided in accordance with the present invention.

A typical Diesel engine map, representing the load and speed operating range of a Diesel engine, is illustrated in FIG. 1. In accordance with the present invention, a low-load area in which the reduction of excess air combined with increased pre-mixed fuel, as taught by the above-referenced U.S. Pat. No. 5,732,554, is ineffective in providing rich pulse control, is delimited (i.e., the boundaries set). This area is identified on the engine map of FIG. 1 as the "low temperature combustion region."

Diesel engines typically operate in a lean to very lean combustion mode. Therefore, when products of rich combustion are required, for example, for the periodic regeneration of a Lean $NO_X$ Trap, actions must be taken to supply a fuel rich exhaust gas. The course of action taken in accordance with the present invention to provide fuel rich combustion is referred to herein as rich pulse control.

Figure 4:
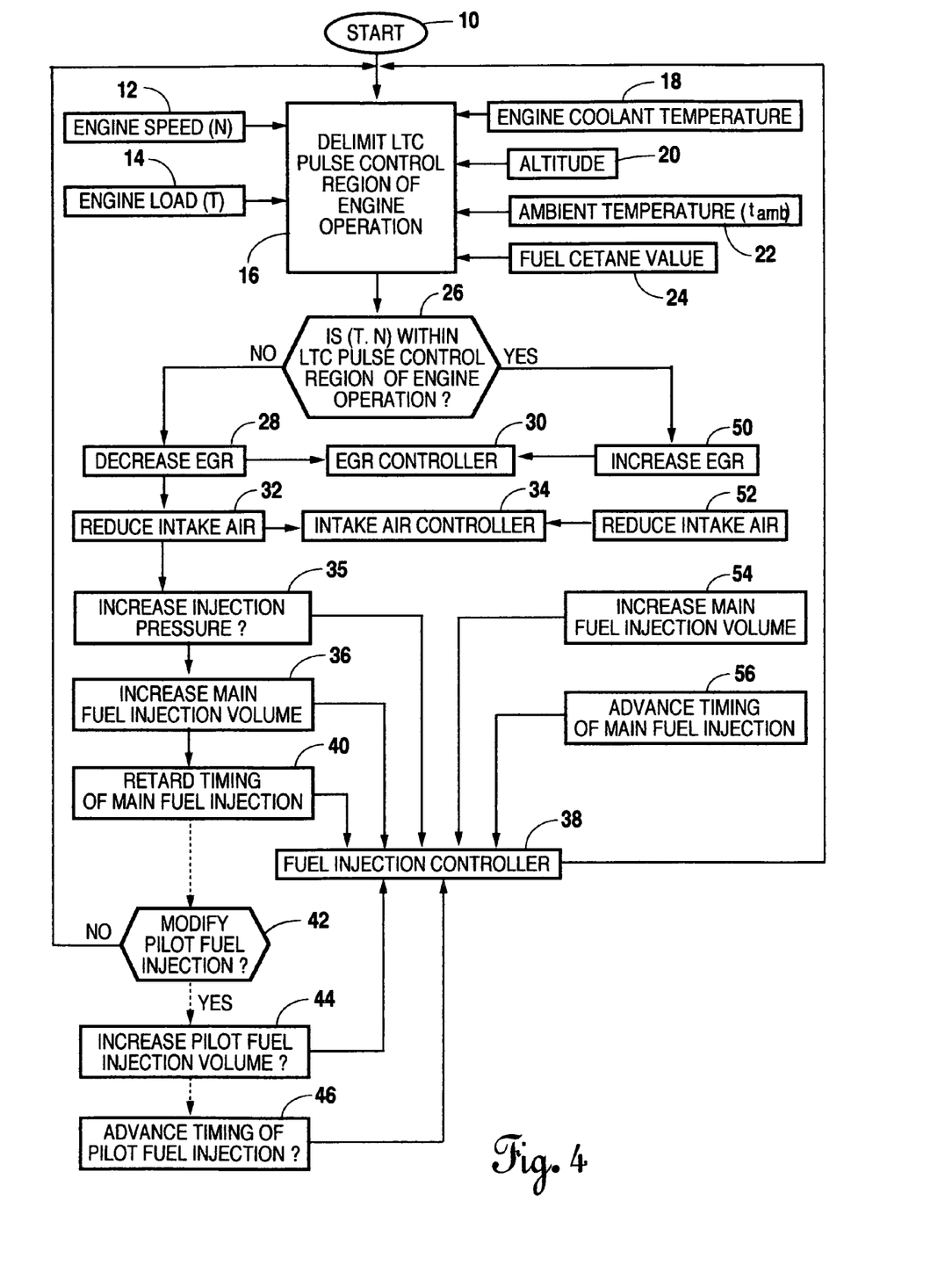
FIG. 4 is a flow chart illustrating the method for selectively providing rich pulse injection when operating at relatively high loads within a Diesel engine operating regime by increasing the local excess air ratio, and when operating at relatively low loads by lowering the combustion temperature, in accordance with the present invention.

When rich pulse control is required, the control method in accordance with the present invention, is illustrated in FIG. 4. On receiving a command to provide rich pulse control, such as after a predetermined length of time of operation or by an appropriate sensor, as indicated at start block 10, the desired low temperature combustion pulse control region of the engine operating map is delimited, or defined, as indicated at block 16. The upper boundaries of the low temperature combustion pulse control region is largely a function of engine speed and engine load, initially set at standard temperature and atmospheric conditions using a defined fuel.

The low temperature combustion pulse control region set under standard conditions may be modified in response to various sensed conditions, such as the engine coolant temperature at block 18, the altitude at block 20, the ambient temperature at block 22, and fuel properties, including cetane value and aromatic fractions, of the combustion fuel as indicated at block 24. For example, the low temperature combustion pulse control region of the engine operating regime is increased, i.e., the engine operating load value raised, in response to a decrease in engine coolant temperature and an increase in altitude, i.e, barometric pressure. In a similar manner, the low temperature combustion control region of the engine operating map is decreased, i.e., the engine operating load lowered, in response to an increase in ambient temperature or the use of a fuel having a higher cetane value than the fuel used to set the initial map. Also, the low temperature combustion control region of the engine operating map is decreased in response to an increase in aromatics fraction.

If the sensed coordinates of engine speed N as represented in block 12, and engine load T as indicated at block 14, are within the defined low temperature combustion pulse control region of the engine operating map, as indicated at block 26, the exhaust gas recirculation rate is increased as indicated at block 50 by sending a signal to an exhaust gas recirculation controller, represented by block 30. Also, the volume of intake air is reduced, as indicated at block 52, by delivering a signal to the intake air controller, represented by block 34. Intake air may be controlled by various well known means such as an intake air throttle or by opening the waste gate or variable nozzle (on turbocharged engines), or both. Also, a signal is delivered to a fuel injector controller represented by block 38 to increase the main fuel injection volume, as indicated at block 54, and advance the timing of the main fuel injection, as indicated at block 56.

Figure 2:
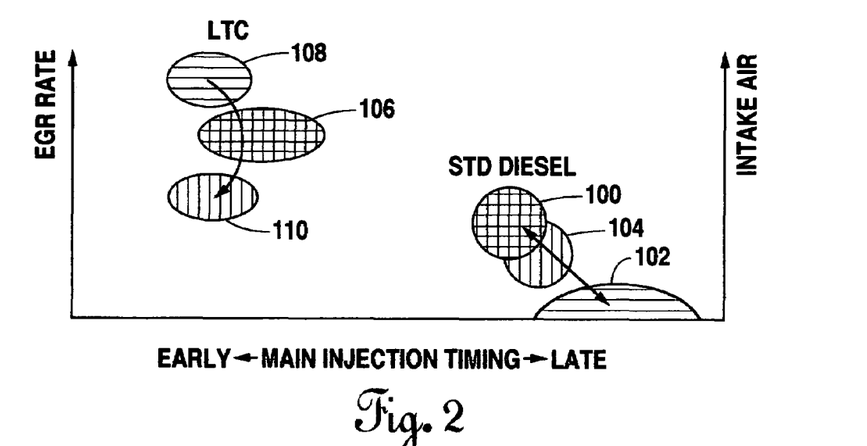
FIG. 2 is a graphical representation of the change in main injection timing, exhaust gas recirculation rate, and intake air volume under low temperature combustion and standard Diesel combustion regions of the engine operating regime, in accordance with the present invention.

The respective changes in exhaust gas recirculation rate and intake air, when operating in the low temperature combustion pulse control region of the engine operating map, are shown in the left-hand portion of FIG. 2. The main injection timing, exhaust gas recirculation rate, and intake air volume providing normal lean combustion prior to implementing rich pulse control, are represented by area 100. To provide rich pulse control when the engine is operating within the defined low temperature combustion region, the increase in exhaust gas recirculation rate, referenced by block 50 in FIG. 4, is indicated at area 108. Similarly, the reduction in intake air, referenced by block 52 in FIG. 4, is indicated by area 110 in FIG. 2. As shown in FIG. 2, the timing of the main fuel injection is also advanced, as noted at block 56 in FIG. 4, concurrently with the described increase in exhaust gas recirculation rate and reduction of intake air volume.

Turning again to FIG. 4, if the coordinates of engine load T and engine speed N are outside of the defined low temperature combustion region of the engine operating map, represented by the "NO" path from decision block 26, the exhaust gas recirculation rate is decreased as indicated at block 28 by a signal delivered to the exhaust gas recirculation rate controller represented by block 30. Also, the volume of intake air is reduced as indicated at block 32 by way of a signal delivered to the intake air controller represented by block 34. The main fuel injection volume is increased, i.e., the injection pressure and/or pulse width increased as indicated at block 36. Increasing the volume of main fuel injection may result solely from an increase in injection pressure as indicated at block 35, or by solely extending the length of time that the fuel is injected, i.e., an increase in pulse width, or by a combination of increased injection pressure and extended pulse width. The appropriate increase in injection volume is directed by way of one or more signals sent to the fuel injection controller represented by block 38. Also, the main fuel injection timing is retarded, as indicated at block 40, by way of a signal to the fuel injection controller.

The modification of exhaust gas recirculation rate, intake air volume, and main injection timing for rich pulse control when the engine is operating outside of the defined low temperature combustion region, is illustrated graphically in the right hand portion of FIG. 2. The exhaust gas recirculation rate, intake air volume, and injection timing prior to implementing rich pulse control are represented by the area 100. The concurrent delay in injection timing and decrease in exhaust gas recirculation rate, including reduction to 0, is indicated by the area 102, whereas decreasing intake air volume is indicated by the area 104.

Figure 3:
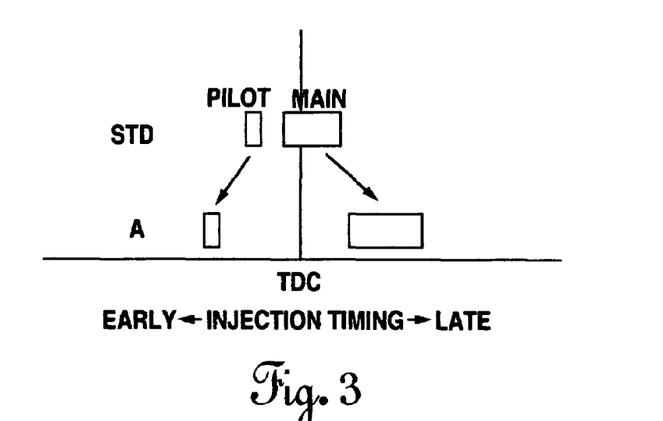
FIG. 3 is a graphical representation of the change in injection timing and volume for rich pulse injection when operating outside of the defined low temperature combustion region of the engine operating regime, in accordance with the present invention.

When the engine load T and engine speed N operating coordinates are outside of the defined low temperature combustion region, it may also be desirable to modify pilot fuel injection to support engine load requirements and maintain combustion stability when rich pulse control is implemented, discussed above in reference to blocks 42, 44, and 46, is illustrated in the left hand portion of FIG. 3, As shown in FIG. 3, main injection timing is retarded from the standard operating condition injection timing. Combustion is aided by utilizing the heat release of the pilot injected fuel and the resultant produced species.

Although the present invention is described in terms of a preferred illustrated embodiment, those skilled in the art will recognize that variations in the described embodiment can be made in carrying out the rich pulse control method of the present invention. For example, additional engine and environmental parameters may be sensed and used to set the boundaries of the low temperature combustion pulse control region of the engine operating map. Such changes embodying the present invention are intended to fall within the scope of the following claims. Other aspects, features and advantages of the present invention may be obtained from a study of this disclosure and the drawings, along with the appended claims.

What is claimed is:

1. A method for controlling fuel injection to provide a rich combustion mixture for periodically regenerating a lean $NO_X$ trap disposed in the exhaust system of a diesel engine in which exhaust gas is recirculated and fuel is injected by pilot and main injections during each combustion cycle, said method comprising:

sensing engine speed;

sensing an operating parameter correlative of engine load;

providing a map of the engine operating regime;

delimiting a region of the engine operating regime in which low temperature combustion is desired to provide a fuel rich combustion mixture;

increasing exhaust gas recirculation when the engine is operating in said delimited region;

reducing intake air when the engine is operating in said delimited region;

increasing the volume of fuel injected during the main fuel injection of the combustion cycle when the engine is operating in said delimited region;

advancing the timing of fuel injected during main fuel injection when the engine is operating in said delimited region;

decreasing exhaust gas recirculation when the engine is operating outside of said delimited region;

reducing intake air when the engine is operating outside of said delimited region;

increasing the volume of fuel injected during main fuel injection when the engine is operating outside of said delimited region; and, retarding the timing of fuel injected during main fuel injection when the engine is operating outside of said delimited region.

2. The method for controlling fuel injection, as set forth in claim 1, wherein said method includes:

increasing the volume of fuel injected during the pilot fuel injection of the combustion cycle when the engine is operating outside of said delimited region; and, advancing the timing of fuel injected during the pilot fuel injection of the combustion cycle when the engine is operating outside of said delimited region.

3. The method for selectively controlling fuel injection, as set forth in claim 1, wherein said method includes:

sensing an engine coolant temperature;

sensing a parameter correlative of the altitude at which said engine is operating;

sensing ambient temperature;

providing a cetane value of a fuel being combusted in said engine;

modifying the delimited region of the engine operating regime by increasing the area of the delimited region to include a higher engine operating load in response to a decrease in engine coolant temperature;

modifying the delimited region of the engine operating regime by increasing the area of the delimited region to include a higher engine operating load in response to an increase in altitude;

modifying the delimited region of the engine operating regime by decreasing the area of the delimited region to a lower engine operating load in response to an increase in ambient temperature; and modifying the delimited region of the engine operating regime by decreasing the area of the delimited region to a lower engine operating load in response to the fuel having a higher cetane value.

4. The method for selectively controlling fuel injection, as set forth in claim 1, wherein said method includes providing a value representative of the aromatics fraction of the fuel being combusted in said engine and modifying the delimited region of the engine operating regime by decreasing the area of the delimited region to a lower engine operating load in response to the fuel having an increase in aromatics fraction.

* * * * *

UNITED STATES PATENT AND TRADEMARK OFFICE
CERTIFICATE OF CORRECTION

| | | |
|---|---|---|
| PATENT NO. | : 7,137,379 B2 | |
| APPLICATION NO. | : 11/168216 | |
| DATED | : November 21, 2006 | |
| INVENTOR(S) | : Sasaki et al. | |

It is certified that error appears in the above-identified patent and that said Letters Patent is hereby corrected as shown below:

The title page showing the illustrative figure should be deleted to be replaced with the attached title page.

The drawing sheets, consisting of Figs. 2 and 4, should be deleted to be replaced with the drawing sheets, consisting of Figs. 2 and 4, as shown on the attached page.

United States Patent
Sasaki et al.

(10) Patent No.: US 7,137,379 B2
(45) Date of Patent: Nov. 21, 2006

(54) METHOD FOR RICH PULSE CONTROL OF DIESEL ENGINES (75) Inventors: Shizuo Sasaki, San Antonio, TX (US); Gary D. Neely, San Antonio, TX (US)

(73) Assignee: Southwest Research Institute, San Antonio, TX (US)

(*) Notice: Subject to any disclaimer, the term of this patent is extended or adjusted under 35 U.S.C. 154(b) by 0 days.

(21) Appl. No.: 11/168,216

(22) Filed: Jun. 28, 2005

(65) Prior Publication Data
US 2006/0037307 A1 Feb. 23, 2006

Related U.S. Application Data (60) Provisional application No. 60/603,204, filed on Aug. 20, 2004.

(51) Int. Cl.
F01N 3/18 (2006.01)
(52) U.S. Cl. ............... 123/299; 123/443; 60/301; 701/103
(58) Field of Classification Search ............... 123/299, 123/443; 60/301; 701/103
See application file for complete search history.

(56) References Cited

U.S. PATENT DOCUMENTS

| | | | |
|---|---|---|---|
| 5,595,060 A * | 1/1997 | Togai et al. | 60/274 |
| 5,657,625 A * | 8/1997 | Koga et al. | 60/274 |
| 5,732,554 A | 3/1998 | Sasaki et al. | |
| 5,937,639 A | 8/1999 | Sasaki et al. | |
| 6,286,482 B1 | 9/2001 | Flynn et al. | |
| 6,338,245 B1 | 1/2002 | Shimoda et al. | |
| 6,389,802 B1 | 5/2002 | Berger et al. | |
| 6,561,157 B1 | 5/2003 | zur Loye et al. | |
| 6,615,580 B1 | 9/2003 | Khair et al. | |
| 6,644,020 B1 | 11/2003 | Kuenstler et al. | |
| 6,907,862 B1 * | 6/2005 | Kitahara | 123/434 |
| 2003/0209009 A1 | 11/2003 | Chamoto et al. | |
| 2003/0213232 A1 * | 11/2003 | Brisley et al. | 60/285 |
| 2005/0222748 A1 * | 10/2005 | Naik et al. | 701/103 |
| 2005/0241296 A1 * | 11/2005 | McCabe et al. | 60/274 |

* cited by examiner

Primary Examiner—Erick R Solis
(74) Attorney, Agent, or Firm—Gunn & Lee, P.C.

(57) ABSTRACT

A combustion control method for the rich pulse control of Diesel engines with Lean $NO_X$ Trap systems includes identifying areas within a Diesel engine operating regime in which reduced recirculated exhaust gas and air with increased pre-mixed combustion is effective in providing fuel rich combustion, and a second, lower load, region in which low temperature combustion is particularly desirable.

4 Claims, 2 Drawing Sheets

UNITED STATES PATENT AND TRADEMARK OFFICE
CERTIFICATE OF CORRECTION

| | | |
|---|---|---|
| PATENT NO. | : 7,137,379 B2 | |
| APPLICATION NO. | : 11/168216 | |
| DATED | : November 21, 2006 | |
| INVENTOR(S) | : Sasaki et al. | |

It is certified that error appears in the above-identified patent and that said Letters Patent is hereby corrected as shown below:

In the drawings, Sheet 1, Fig. 2, a flow line begins at area 106 and continues to area 108 and a second flow line begins from area 106 and continues to area 110; and, a flow line begins at area 100 and continues to area 102 and a second flow line begins at area 100 and continues to area 104:

UNITED STATES PATENT AND TRADEMARK OFFICE
CERTIFICATE OF CORRECTION

PATENT NO. : 7,137,379 B2
APPLICATION NO. : 11/168216
DATED : November 21, 2006
INVENTOR(S) : Sasaki et al.

It is certified that error appears in the above-identified patent and that said Letters Patent is hereby corrected as shown below:

In the drawings, Sheet 2, Fig. 4, a flow line begins at block 50 and continues to block 52; another flow line begins at block 52 and continues to block 54; and yet another flow line begins at block 54 and continues to block 56:

Fig. 4

UNITED STATES PATENT AND TRADEMARK OFFICE
CERTIFICATE OF CORRECTION

PATENT NO.        : 7,137,379 B2
APPLICATION NO.   : 11/168216
DATED             : November 21, 2006
INVENTOR(S)       : Sasaki et al.

It is certified that error appears in the above-identified patent and that said Letters Patent is hereby corrected as shown below:

Column 4, line 5, the text should read: "combustion --rich-- pulse control region of the engine operating".

In column 4, line 10, the reference numeral "100" should read --106--.

Signed and Sealed this

Twenty-ninth Day of July, 2008

JON W. DUDAS
*Director of the United States Patent and Trademark Office*